M. F. CARR.
STUD.
APPLICATION FILED JUNE 11, 1919.

1,335,220. Patented Mar. 30, 1920.

Inventor:
Moses F. Carr,
by Emery, Booth, Janney & Varney
Attys.

UNITED STATES PATENT OFFICE.

MOSES F. CARR, OF NEWTON, MASSACHUSETTS, ASSIGNOR TO CARR FASTENER COMPANY, OF CAMBRIDGE, MASSACHUSETTS, A CORPORATION OF MAINE.

STUD.

1,335,220.     Specification of Letters Patent.     Patented Mar. 30, 1920.

Application filed June 11, 1919. Serial No. 303,356.

*To all whom it may concern:*

Be it known that I, MOSES F. CARR, a citizen of the United States, and a resident of Newton, in the county of Middlesex and Commonwealth of Massachusetts, have invented an Improvement in Studs, of which the following description, in connection with the accompanying drawings, is a specification, like characters on the drawings representing like parts.

This invention pertains to improvements in studs for use in connection with stud and socket fasteners. While my improved stud is of use in many connections, it is particularly useful where used in fasteners of the general type shown in United States Patent No. 1,070,113 issued August 12, 1913.

The invention is particularly useful where wood or machine screws are used for attaching the stud.

In the drawings:—

Figure 1:
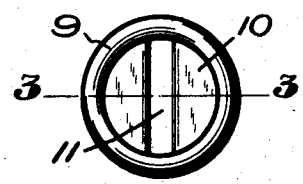
Figure 1 is a plan of a preferred form of stud.
Figure 2:
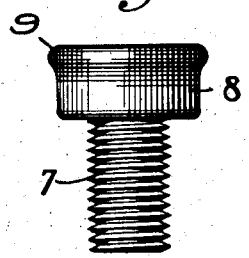
Fig. 2 is a side elevation thereof.
Figure 3:
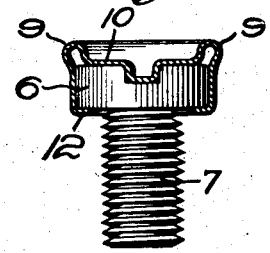
Fig. 3 is a section, partly in elevation, on the line 3—3 of Fig. 1.
Figure 4:
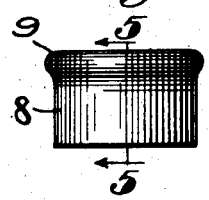
Fig. 4 is a side elevation of the stud cap prior to attachment thereof to the screw.
Figure 5:
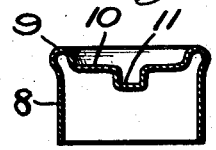
Fig. 5 is a section, partly in elevation, on the line 5—5 of Fig. 4.

In the preferred form of my invention shown in the drawings, I have shown a screw head 6, which is preferably of the fillister head type, provided with a threaded portion 7 herein shown as of the usual machine screw type. The screw may be of any suitable material, but I prefer steel. The head of the screw is provided with a cap portion 8, preferably of brass which may be nickeled, and providing a preferably continuous rim 9 surrounding a central disk 10, the disk being preferably recessed to provide a slot 11 within and engaging the sides of the slot in the head of the screw. The slot 11 is preferably of sufficient length to extend across the entire distance between opposite sides of the rim 9. The cap may be secured to the head of the screw by a flange portion 12, rotation of screw and cap one relative to the other being prevented by the interengaging slot portions.

While I have shown and described a preferred embodiment of my invention, it will be understood that considerable changes may be made therein without departing from the scope of my invention, which is best defined in the following claims:—

1. A stud for stud and socket fasteners comprising, in combination, a body portion having a head and a threaded extension therefrom, and a cap portion over said head, said cap portion providing a slot entering a slot extending completely across said head portion.

2. A stud for stud and socket fasteners comprising, in combination, a body portion having a head and a threaded extension therefrom, a cap portion over said head, said cap portion providing a slot entering a slot in said head portion and providing a continuous ring surrounding the end of said head, said slots terminating interiorly of said ring.

3. A stud for stud and socket fasteners comprising, in combination, a body portion having a head and a threaded extension thereform for entrance into a supporting member, said head having a recessed portion on its upper face, and a cap portion overlying said head providing a continuous peripheral ring and having a depression within said ring entering the depressed portion of said body portion.

4. A stud for stud and socket fasteners comprising, in combination, a screw having a slotted head and a cap overlying said head provided with a central depressed portion entering the slotted portion of the screw, said cap providing a stud head of greater diameter than the head of said screw.

5. A stud for stud and socket fasteners comprising, in combination, a screw having a slotted head and a threaded projection therefrom, and a cap for said screw covering the slotted end of said head and providing a depressed central portion entering said slot.

6. A stud for stud and socket fasteners comprising, in combination, a screw having a slotted head and a threaded projection therefrom, a cap for said screw covering the slotted end of said head and oroviding a depressed central portion entering said slot and a continuous rim portion extending around the periphery of said cap beyond the ends of said depressed portion.

7. A stud for stud and socket fasteners comprising, in combination, a body portion having a head and an extension therefrom for entrance into a supporting member, and a cap portion over said head, said cap portion providing a continuous ring surrounding peripherally the outer end of said head and extending a substantial distance beyond said end of said head.

8. A stud for stud and socket fasteners comprising, in combination, a screw having a slotted head and a cap overlying said head provided with a central depressed portion entering the slotted portion of the screw, said cap providing a stud head of greater diameter than the head of said screw and extending beyond the face thereof.

In testimony whereof, i have signed my name to this specification.

MOSES F. CARR.